US012162032B2

(12) United States Patent
Falcon et al.

(10) Patent No.: US 12,162,032 B2
(45) Date of Patent: Dec. 10, 2024

(54) SPRAYERS, DISPENSERS, AND METHODS FOR USING THE SAME

(71) Applicant: Silgan Dispensing Systems Corporation, Grandview, MO (US)

(72) Inventors: Sarah D. Falcon, Richmond, VA (US); Kelly Harrigan, Richmond, VA (US); Steve L. Sweeton, Lake Winnebago, MO (US); Eelco H. Deman, Vlijmen (NL); Brandon L. Ramsuer, Henrico, VA (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 17/929,355

(22) Filed: Sep. 2, 2022

(65) Prior Publication Data

US 2022/0410191 A1 Dec. 29, 2022

Related U.S. Application Data

(63) Continuation of application No. 16/476,910, filed as application No. PCT/US2018/015441 on Jan. 26, 2018, now Pat. No. 11,478,808.

(60) Provisional application No. 62/452,003, filed on Jan. 30, 2017.

(51) Int. Cl.

| | |
|---|---|
| ***B05B 9/04*** | (2006.01) |
| ***B05B 9/08*** | (2006.01) |
| ***B05B 11/00*** | (2023.01) |
| ***B05B 11/04*** | (2006.01) |
| ***B05B 11/10*** | (2023.01) |
| ***B65D 47/04*** | (2006.01) |

(Continued)

(52) U.S. Cl.
CPC .......... *B05B 9/0861* (2013.01); *B05B 9/0426* (2013.01); *B05B 11/0027* (2013.01); *B05B 11/0056* (2013.01); *B05B 11/0094* (2013.01); *B05B 11/04* (2013.01); *B05B 11/1057* (2023.01); *B65D 47/04* (2013.01); *B65D 47/06* (2013.01); *B65D 47/30* (2013.01)

(58) Field of Classification Search
CPC . B05B 9/0861; B05B 9/0426; B05B 11/0027; B05B 11/0056; B05B 11/0094; B05B 11/04; B05B 11/1057; B65D 47/04; B65D 47/06; B65D 47/30
See application file for complete search history.

(56) References Cited

U.S. PATENT DOCUMENTS

| | | | |
|---|---|---|---|
| 2,723,056 | A | 11/1955 | Smith |
| 3,837,533 | A | 9/1974 | Splan |
| 3,907,174 | A | 9/1975 | Steiman |

(Continued)

FOREIGN PATENT DOCUMENTS

| | | | |
|---|---|---|---|
| CN | 103861761 | A | 6/2014 |
| CN | 105912611 | A | 8/2016 |

(Continued)

*Primary Examiner* — Frederick C Nicolas
(74) *Attorney, Agent, or Firm* — Hinckley Allen & Snyder; Stephen Holmes

(57) ABSTRACT

Dispensing systems (100) having wands (110) for distributing a spray away from a user include moveable wands (110), wands for locking actuation of the dispensing system (210), wands and dispensers providing gravity fed dispensing solutions (410) for battery-operated devices (500) and improved dispensers.

11 Claims, 8 Drawing Sheets

(51) Int. Cl.

| | |
|---|---|
| ***B65D 47/06*** | (2006.01) |
| ***B65D 47/30*** | (2006.01) |

(56) References Cited

U.S. PATENT DOCUMENTS

| | | | |
|---|---|---|---|
| 4,234,127 A | 11/1980 | Tada | |
| 4,618,099 A | 10/1986 | Nagao | |
| 4,790,454 A | 12/1988 | Clark | |
| 4,925,105 A | 5/1990 | Lin | |
| 5,097,540 A * | 3/1992 | Lovitt | A61M 3/0254 4/443 |
| 5,188,259 A | 2/1993 | Petit | |
| 5,526,957 A | 6/1996 | Brown | |
| 5,864,895 A * | 2/1999 | Ota | A47K 7/08 601/154 |
| 5,875,936 A | 3/1999 | Turbett | |
| 5,908,256 A | 6/1999 | Bernstein | |
| 6,116,458 A | 9/2000 | Dark | |
| 6,161,777 A | 12/2000 | Carter et al. | |
| 6,283,656 B1 | 9/2001 | Jiang | |
| 6,494,344 B1 | 12/2002 | Kressel, Sr. | |
| 6,560,806 B1 | 5/2003 | Lawson | |
| 6,561,386 B1 | 5/2003 | Martens | |
| 7,021,571 B1 | 4/2006 | Lawson | |
| 7,118,050 B1 | 10/2006 | Chen | |
| 7,789,275 B2 | 9/2010 | Englhard | |
| 8,200,025 B2 | 6/2012 | Woodbeck | |
| 8,468,635 B2 | 6/2013 | Nikitczuk | |
| 8,833,617 B1 | 9/2014 | Compton | |
| 9,393,583 B2 | 7/2016 | Tu | |
| 9,676,007 B1 | 6/2017 | Kane | |
| 10,252,284 B2 | 4/2019 | Arminak | |
| 10,311,096 B2 | 6/2019 | Gu et al. | |
| 10,751,741 B2 | 8/2020 | Santagiuliana | |
| 11,122,243 B2 | 9/2021 | Emig et al. | |
| 11,478,808 B2 * | 10/2022 | Falcon | B65D 47/06 |
| 2002/0125341 A1 | 9/2002 | Perkitny | |
| 2003/0075567 A1 | 4/2003 | Santagiuliana | |
| 2004/0178223 A1 | 9/2004 | Foster | |
| 2006/0006201 A1 | 1/2006 | Rueschhoff | |
| 2006/0027680 A1 | 2/2006 | Wu | |
| 2006/0243749 A1 | 11/2006 | Robertson | |
| 2007/0114302 A1 | 5/2007 | Wu | |
| 2007/0181605 A1 | 8/2007 | Yang | |
| 2008/0029620 A1 | 2/2008 | Hillhouse | |
| 2009/0039114 A1 | 2/2009 | Yamamoto et al. | |
| 2010/0163646 A1 * | 7/2010 | Havlovitz | B05B 9/0861 239/375 |
| 2012/0223160 A1 | 9/2012 | Goodwin | |
| 2013/0024382 A1 | 1/2013 | Dala et al. | |
| 2013/0054603 A1 | 2/2013 | Birdwell et al. | |
| 2013/0249783 A1 | 9/2013 | Sonntag | |
| 2014/0113076 A1 | 4/2014 | Greer, Jr. et al. | |
| 2015/0001257 A1 | 1/2015 | Sell | |
| 2015/0129682 A1 | 5/2015 | Mitchell | |
| 2016/0350336 A1 | 12/2016 | Checka et al. | |
| 2016/0358024 A1 | 12/2016 | Krishnakumar et al. | |
| 2017/0249339 A1 | 8/2017 | Lester | |
| 2017/0278135 A1 | 9/2017 | Majumdar et al. | |
| 2018/0085770 A1 | 3/2018 | Goodwin | |
| 2019/0023235 A1 | 1/2019 | Vidovic | |

FOREIGN PATENT DOCUMENTS

| | | |
|---|---|---|
| JP | H1014949 A | 1/1998 |
| JP | 2018002208 A | 1/2018 |
| WO | 2004080515 A | 9/2004 |

* cited by examiner

SPRAYERS, DISPENSERS, AND METHODS FOR USING THE SAME

CROSS-REFERENCE TO RELATED APPLICATIONS

This application is a continuation of U.S. application Ser. No. 16/476,910, filed Jul. 10, 2019, which is a 371 National Stage filing of PCT/US2018/015441, filed Jan. 26, 2018, which claims the benefit of U.S. Provisional Application No. 62/452,003, filed Jan. 30, 2017, the entire contents of which are incorporated herein by reference.

BACKGROUND OF THE INVENTION

Field of the Invention

Embodiments of the invention relate to sprayer and dispenser devices and more particularly to sprayers and dispensers for delivering sustained duration spray of a product through manual actuation or battery operated or assisted actuation of a dispensing system.

State of the Art

Dispensing systems and dispensers are used for a variety of purposes. For example, trigger sprayers, aspirators, aerosols, battery-operated sprayers, and other devices are used to disperse liquids for cleaning, pest control, and other purposes. In some instances, it is desirable to provide a dispenser or dispensing system having a wand or extension to move the point of dispensing away from a user and closer to the intended point of use. In other instances, it is desirable to provide mechanical systems, such as a battery powered motor, to deliver a stream of fluid.

While various dispensers and dispensing systems exist, there is a need for improved and new devices that may improve user experience and application of various fluids or products for various purposes.

BRIEF SUMMARY OF THE INVENTION

According to certain embodiments of the invention, a squeeze sprayer dispenser may include an extendable or foldable wand that may be used to direct or control the application of a product from the squeeze sprayer dispenser.

According to other embodiments of the invention, a trigger sprayer may be configured with a wand or with a nozzle attached to a wand. The wand may be extended to allow the trigger sprayer to actuate and the wand may direct the flow of product to a desired area. In addition, the wand may be configured, in some embodiments of the invention, to mate with a trigger or a portion of a bottle such that the wand prevents actuation of the trigger sprayer during shipping.

According to some embodiments of the invention, a dispenser may be integrated with a bottle. A motor, battery case (or other power source), and actuator may be integrated with or assembled onto a bottle to provide a battery-operated dispensing experience for a user.

In still other embodiments of the invention, a remote dispenser may be provided wherein the remote dispenser may be refilled from a container. A container may include system for refilling the remote dispenser.

In other embodiments of the invention, an improved dispenser may include a wand having a particular angle with respect to a hand grip portion of the dispenser. In some embodiments, the angle may be around 30 degrees. In other embodiments, an improved dispenser may include features configured to allow continuous actuation of a dispenser or an "on-lock" allowing a user to lock the dispenser in a dispensing state. Still other improvements may include a "boost" button that allows a user to selectively increase the power supplied to a motor in a battery operated or powered sprayer such that actuation of the "boost" button may provide improved dispensing or an increase in dispensing power. Still other embodiments of an improved dispensing system may include an attachment for a remote dispenser wherein the attachment is integrated with the bottle of the dispensing system.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
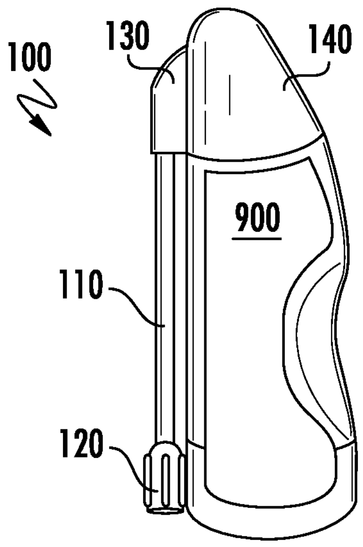
FIG. 1 illustrates a dispenser according to certain embodiments of the invention.
Figure 2:
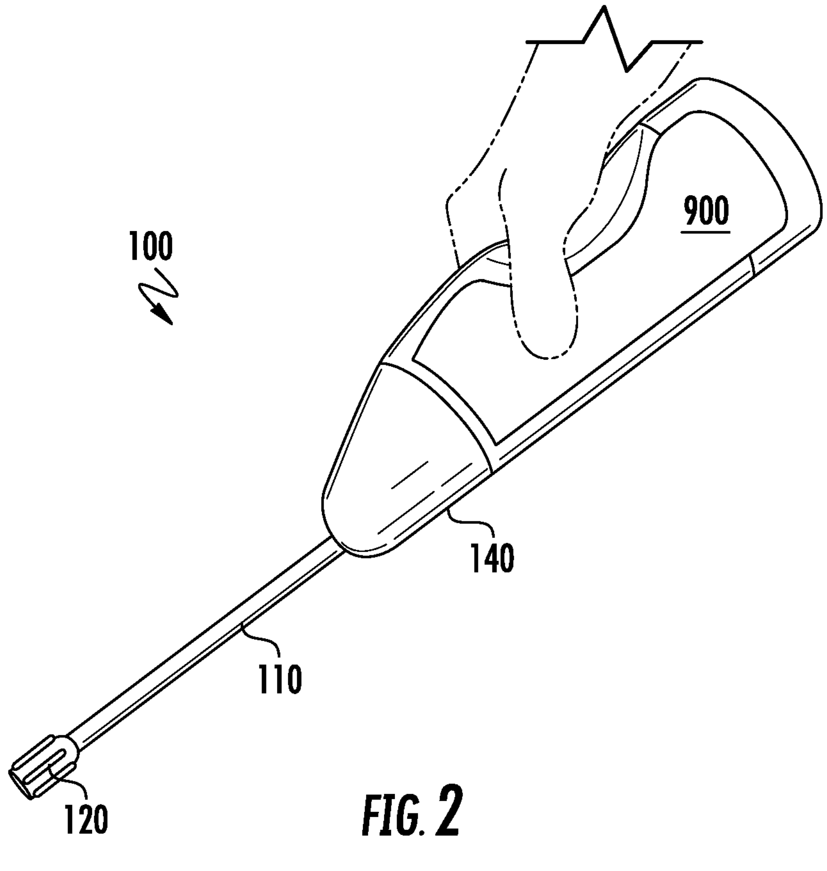
FIG. 2 illustrates the dispenser illustrated in FIG. 1 in operation according to certain embodiments of the invention.

According to embodiments of the invention, a squeeze sprayer dispenser 100 may include a container 900 in fluid communication with a wand 110 as illustrated in FIGS. 1 and 2. A wand 110 may include a first end connected to a nozzle 120. A second end of the wand 110 may be attached to the container 900 or may be attached to a dispensing regulation system attached to the container 900. For example, a cap 140 may be attached to a container 900 and a rotatable joint 130. The rotatable joint 130 may be attached to the second end of the wand 110. Movement of the rotatable joint 130 may move the wand 110 from an "off" position wherein the wand 110 is seated next to a container 900 as illustrated in FIG. 1. Wand 110 may be rotated by moving the rotatable joint 130 so that the wand 110 is in an "on" position as illustrated in FIG. 2. In an "on" position, a user may squeeze or apply pressure to the container 900 to force a product through the wand 110 and out the nozzle 120. In the "off" position, the positioning of the rotatable joint 130 may prevent product from flowing from the container 900 into the wand 110.

A nozzle 120 used with a squeeze sprayer dispenser 100 as illustrated in FIGS. 1 and 2 may include an adjustable nozzle 120. An adjustable nozzle 120 may be rotated to select a particular spray pattern or to stop flow of product from the nozzle 120 in an "nozzle off" position.

Figure 3:
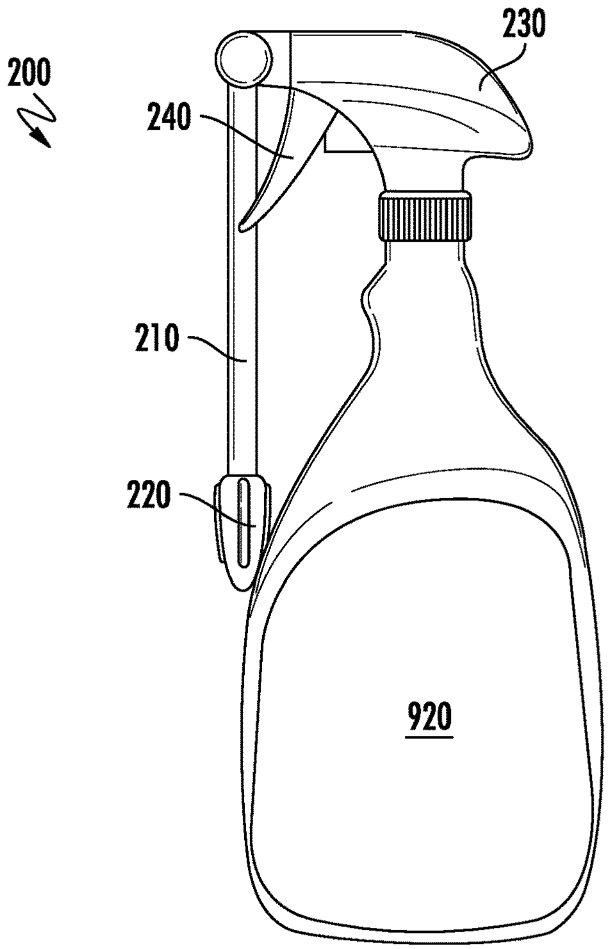
FIG. 3 illustrates a dispenser according to various embodiments of the invention.
Figure 4:
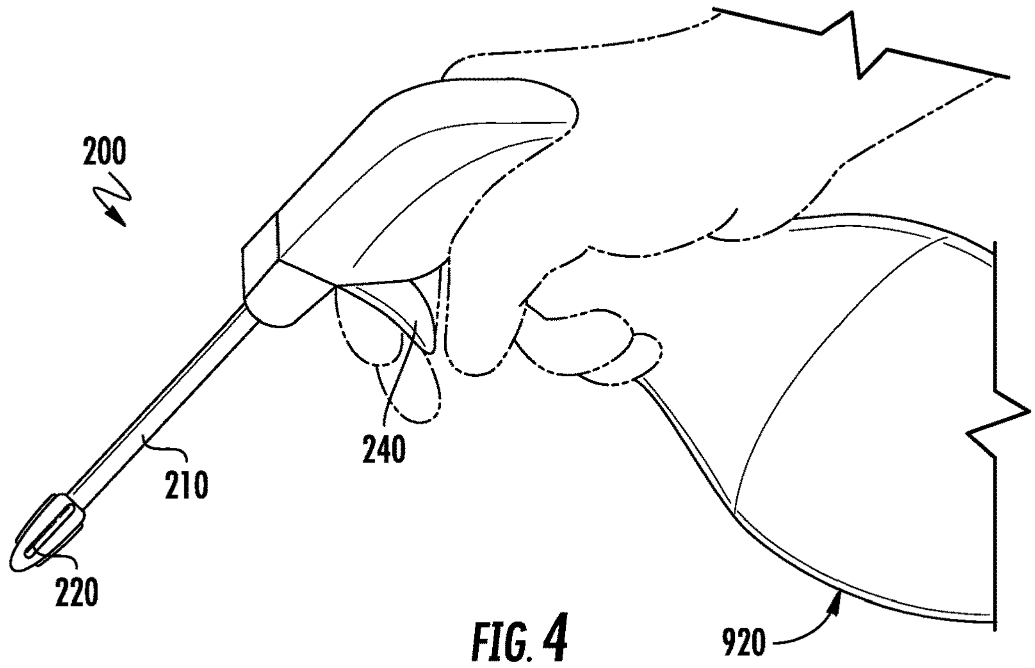
FIG. 4 illustrates the dispenser illustrated in FIG. 3 in operation according to various embodiments of the invention.

A dispensing system 200 according to some embodiments of the invention may include a trigger sprayer 230 mounted on a container 920 with a wand 210 attached to or assembled with the trigger sprayer 230 as illustrated in FIGS. 3 and 4. The trigger sprayer 230 may be a traditional trigger sprayer having a modified nozzle wherein the modified nozzle includes a rotatable joint connected to one end of a wand 210. The other end of the wand 210 may be connected to a nozzle 220 used for controlling spray from the dispensing system 200.

A dispensing system 200 in an "off" or non-actuation position is illustrated in FIG. 3. As shown, a wand 210 may be folded down, against or adjacent to the container 920. The position of the wand 110 relative to the container 920 and the trigger sprayer 230 may prevent actuation of the dispensing system 200 in the "off" position. In addition, a rotatable joint between the wand 210 and the trigger sprayer 230 may seal off a fluid or product path between the container 920 and the wand 210 when the wand 210 is in the "off" position as illustrated in FIG. 3.

Rotation of the wand 210 about the rotatable joint may move the wand 210 into a position from which the trigger sprayer 230 may be actuated by a user pulling on the trigger 240. Extension of the wand 210 moves the point from which the product is dispersed away from the user. When the trigger 240 is actuated, fluid or product from the container 920 may be dispensed by the trigger sprayer 230 into the wand 210. Fluid or product entering the wand 210 is then dispersed from the wand 210 through the nozzle 220. The nozzle 220 may be adjusted to select a desired spray pattern and various nozzles 220 having various spin mechanics may be used with various embodiments of the invention.

Figure 5:
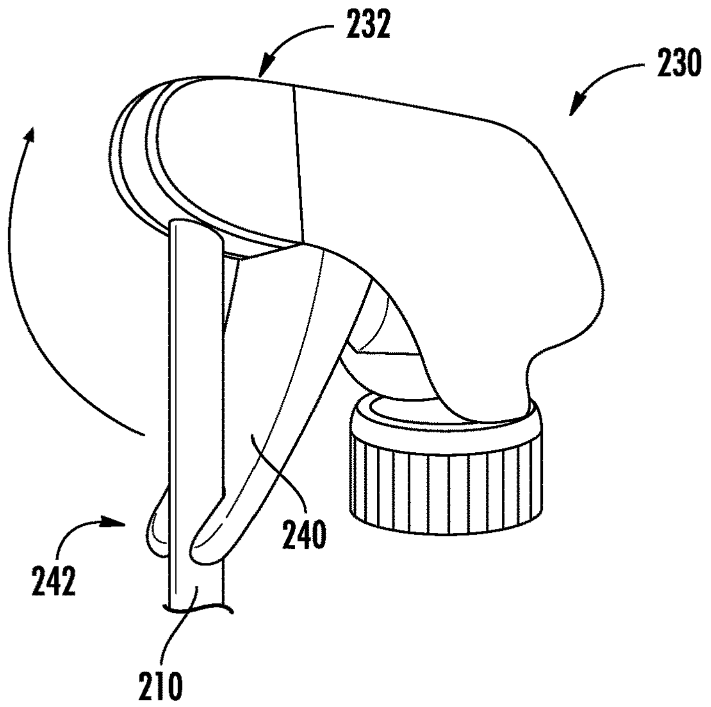
FIG. 5 illustrates a dispenser according to various embodiments of the invention.

According to some embodiments of the invention, a dispensing system 200 may include additional features that secure the wand 210 in an "off" position. As illustrated in FIG. 5, a trigger 240 may include a trigger notch 242. The trigger notch 242 may be configured such that the wand 210 may snap into the trigger notch 242, thereby preventing the wand 210 from being extended without application of a desired force. The trigger notch 242 may secure the wand 210 such that the wand 210 is not inadvertently moved. For example, when shipping the dispensing system 200, the fitment of the wand 210 into the trigger notch 242 prevents the trigger 240 from being actuated. It also keeps the wand 210 positioned in an "off" position which prevents leakage of product from the container 920.

According to various embodiments of the invention, a trigger notch 242 and wand 210 combination provides a secure locking system for e-commerce products. In many instances, trigger sprayers shipped in traditional e-commerce packaging may leak or inadvertently actuate or spray as the trigger is pressed as a result of normal movement during handling. The inclusion of a trigger notch 242 capable of snapping into a wand 210 prevents such inadvertent actuation during handling and shipment of such products.

While the trigger notch 242 may be used with a dispensing system 200 having a wand 210, other embodiments of the invention include the use of a nozzle clip 232 which may be used with trigger sprayers 230 not assembled with a wand 210. In such embodiments, a nozzle clip 232 may be configured to snap over the nozzle of a traditional trigger sprayer. The trigger sprayer may be assembled with a trigger 240 having a trigger notch 242. The nozzle clip 232 may include an extension that is configured like a wand such that when the nozzle clip 232 is attached over a nozzle of a trigger sprayer 230, the extension fits into or snaps into the trigger notch 242 to secure the trigger 240 and prevent inadvertent actuation thereof during shipping.

Figure 6:
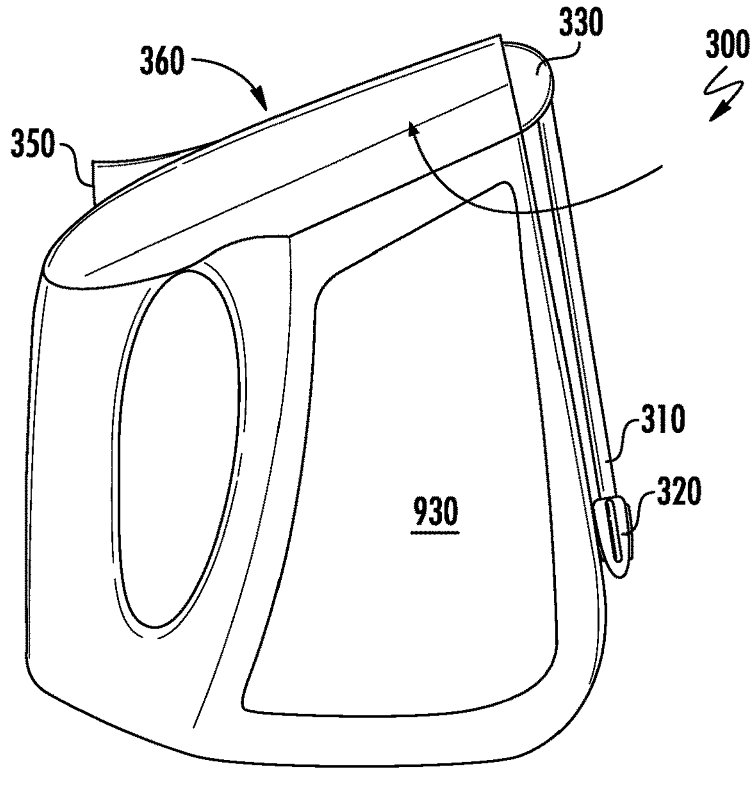
FIG. 6 illustrates a dispenser according to various embodiments of the invention.
Figure 7:
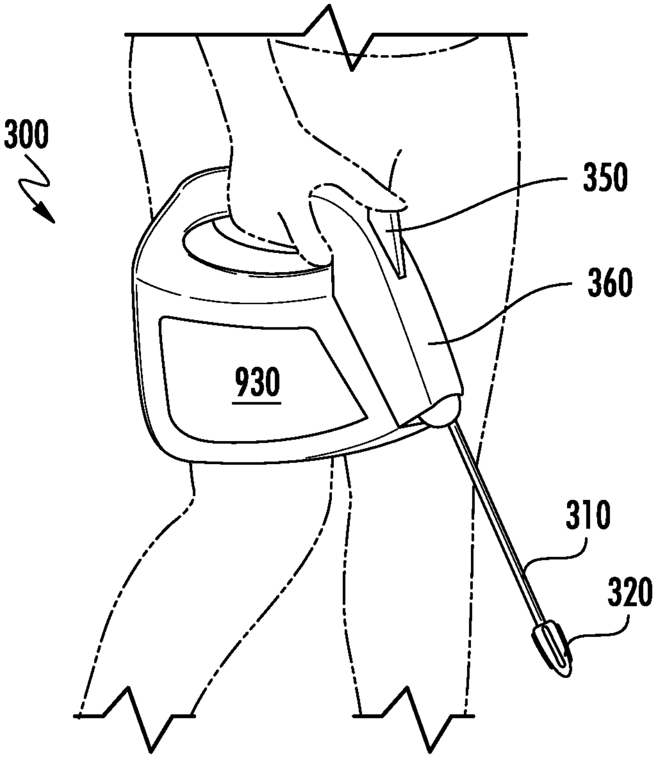
FIG. 7 illustrates the dispenser illustrated in FIG. 6 in operation according to various embodiments of the invention.

A dispensing system 300 according to still other embodiments of the invention is illustrated in FIGS. 6 and 7. As illustrated, a dispensing system 300 may include a container 930 holding a product, a dispensing unit 360 attached to the container 930, and a wand 310 in fluid communication with the container 930. As illustrated in FIG. 6, the dispensing system 300 may include an "off" position in which a wand 310 is folded against or near the container 930. The wand 310 may have a first end attached to a nozzle 320 and a second end attached to a joint 330 or other mechanism to connect the wand 310 to the dispensing unit 360. The dispensing unit 360 may be attached to or assembled onto the container 930. In some embodiments of the invention, the dispensing unit 360 may include an actuation button 350 or trigger. In some embodiments, actuation of the button 350 may actuate a pump within the dispensing unit 360 in a manner similar to a trigger sprayer or other spray system. In other embodiments of the invention, the dispensing unit 360 may be a battery powered system having one or more motors for pumping product from the container 930 and into the wand 310. For instance, in some embodiments of the invention, the dispensing unit 360 may house a battery-operated spray mechanism capable of pumping product from the container 930 and through the wand 310. The battery-operated system may draw power from batteries sorted within the handle of the container 930, stored within the dispensing unit 360, or stored elsewhere. In some embodiments, the batteries are replaceable. In other embodiments, the batteries or battery may be of the rechargeable-type and a recharging plug or connection may be included as part of the dispensing unit 360.

To operate the dispensing system 300, a user may move the wand 310 from the "off" position to an "on" position as illustrated in FIG. 7. Depression of the button 350 may provide power to a battery-operated motor stored in the dispensing unit 360 which in turn pumps or moves product from within the container 930 into the wand 310 and then out the nozzle 320. The nozzle 320 may be an adjustable nozzle 320. Different container 930 sizes may be configured with dispensing units 360 to provide the desired amount of product for a particular use. Integration of the dispensing unit 360 with the container 930 allows a user to operate the dispensing system 300 with one hand and eliminates the need for a connection hose as used with many conventional battery-operated sprayers.

According to some embodiments of the invention, a dispensing system 300 may also be gravity fed to some extent. For example, the dispensing system 300 illustrated in FIG. 7 has a general wand 310 output near an intersection of the container 930 with the dispensing unit 360. This is a low-point in the system and as product is drained from the container 930 the front corner of the container 930 where it intersects with the dispensing unit 360 will attract the last of the product. Having an opening or input from the container 930 into the dispensing unit 360 in this location allows the dispensing unit 360 to obtain product through gravity feeding. The ability to gravity feed the dispensing system 300 may offer many advantages. In some instances, the ability to gravity feed reduces or eliminates priming issues which are commonly found or experiences with large, hose fed systems. In addition, the elimination of large amounts of hose through which priming must occur, eliminates strain on the batteries, providing a longer life for the dispensing system 300 utilizing the same number of batteries or the same life with fewer batteries. Saving power and utilizing fewer batteries per unit output also saves on cost.

Figure 8:
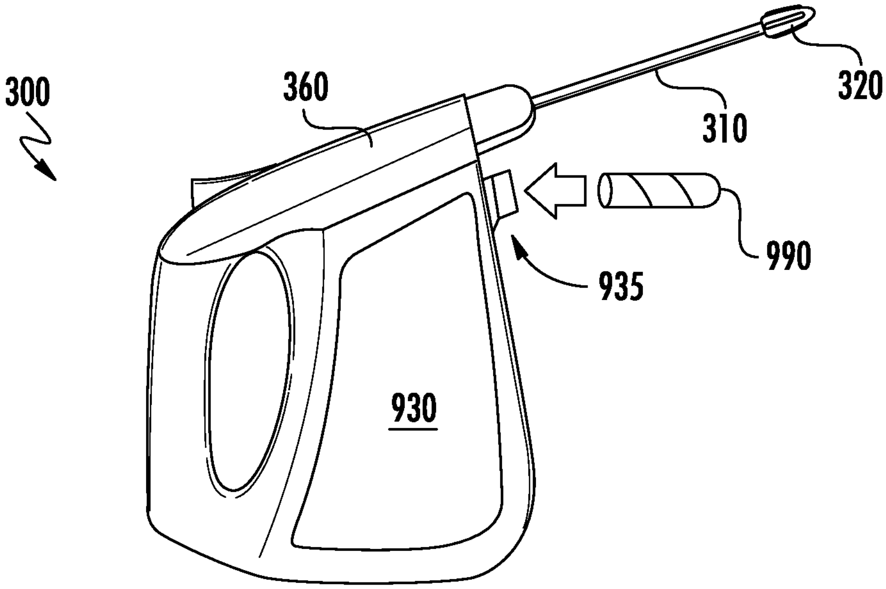
FIG. 8 illustrates a dispenser according to various embodiments of the invention.

A dispensing system 300 according to still other embodiments of the invention is illustrated in FIG. 8. As illustrated, the dispensing system 300 may include a dispensing unit 360 and wand 310 as with the embodiments illustrated in FIGS. 6 and 7. However, the container 930 may include a refill port 935. The refill port 935 may be used to add water, product, or product concentrate into the container 930. For example, the dispensing system 300 may be sold with two "charges" or cartridges with a sufficient amount of concentrate to make two containers 930 of product. The cartridges may be shipped with the dispensing system 300 and an empty container 930. A user may then open the refill port, insert one of the cartridges (or pour the contents of a cartridge) into the container 930, and add sufficient water to fill the container 930 and mix the product. In this fashion, the dispensing system 300 can be sold and shipped without product in the container 930, greatly reducing the weight of the dispensing system 300 and costs associated therewith.

Figure 9:
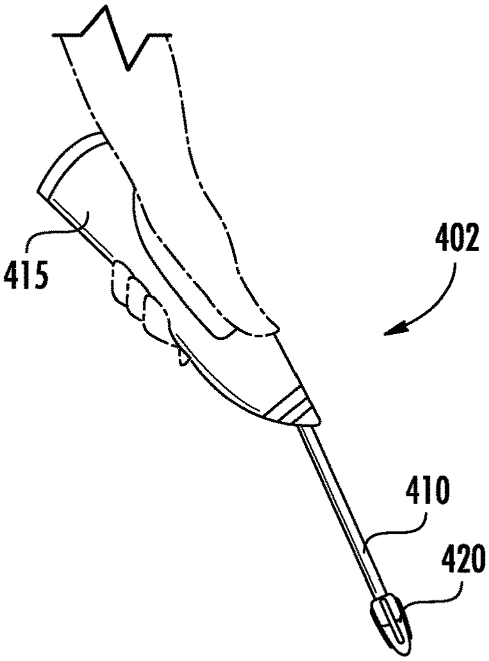
FIG. 9 illustrates a dispenser in operation according to various embodiments of the invention.
Figure 10:
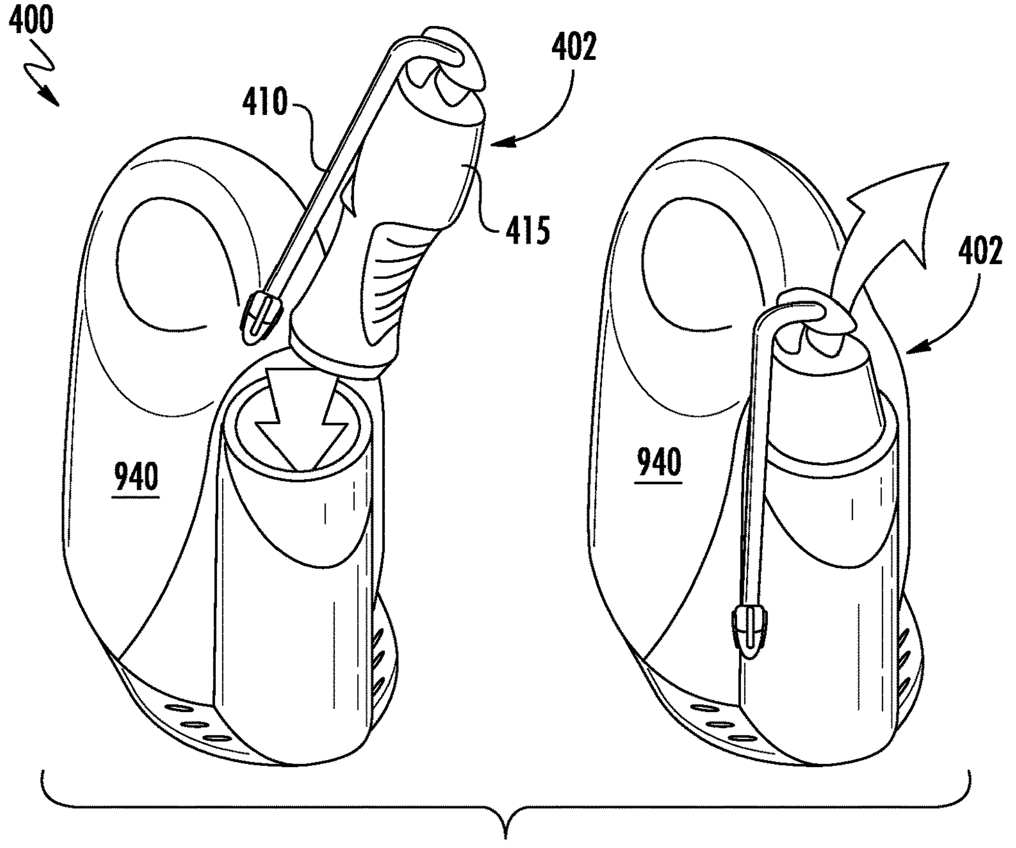
FIG. 10 illustrates a dispensing system utilizing the dispenser of FIG. 9 in a refill configuration according to various embodiments of the invention.

A dispensing system 400 according to still other embodiments of the invention is illustrated in FIGS. 9 and 10. A dispensing system 400 may include a dispenser 402 as illustrated in FIG. 9. A dispenser 402 may include a product application reservoir 415 connected to one end of a wand 410, the other end of the wand 410 being connected to a nozzle 420, which may be adjustable. The product application reservoir 415 may be charged with a product and may include internal components for pushing or pumping the contents of the product application reservoir 415 through the wand 410 and the nozzle 420. When the product application reservoir 415 is depleted or empty, it may be inserted into a holster or sheath connected to—or part of—the container 940. The product application reservoir 415 may include a mating feature that may mate with a transfer feature within the holster or sheath to refill the product application reservoir 415 with product from the container 940. For example, as illustrated in FIG. 10, the dispenser 402 may be inserted into the holster or sheath and recharged. Once recharged, the dispenser 402 may be stored in the holster or sheath or removed, so that the wand 410 may be extended and application of the product may commence as illustrated in FIG. 9.

Figure 11:
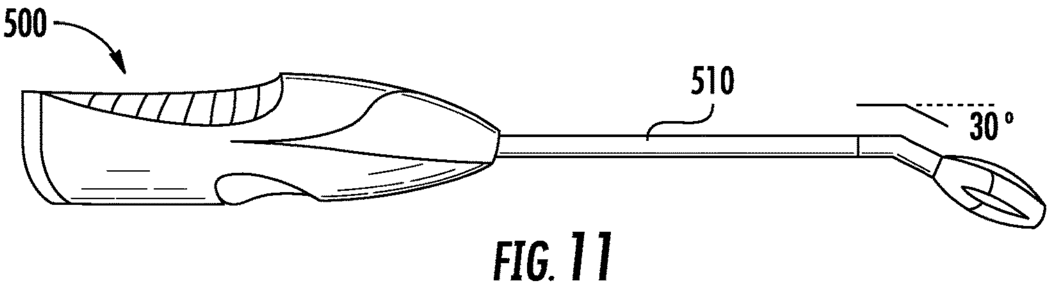
FIG. 11 illustrates a dispenser according to the Prior Art.

FIG. 11 illustrates a dispenser 500 as known in the art. As illustrated, the dispenser 500 includes a body and a wand 510. The wand 510 is generally parallel to the body until the tip of the wand 510 where a short, 30-degree angle meets with a nozzle.

Figure 12:
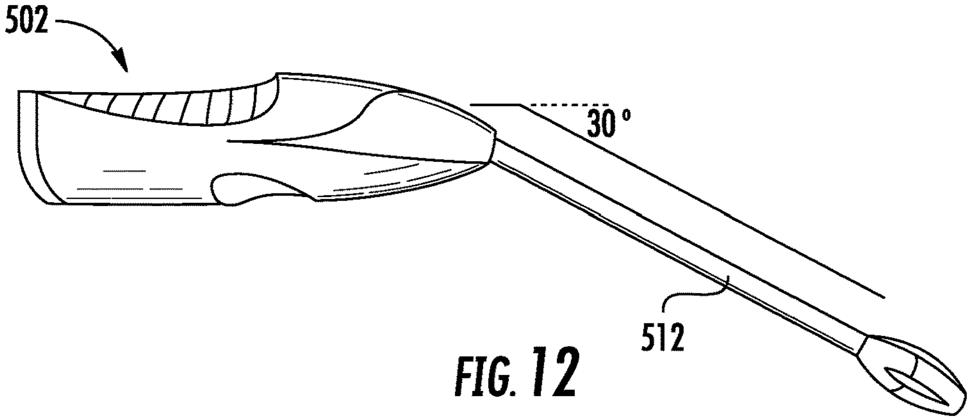
FIG. 12 illustrates an improved dispenser according to various embodiments of the invention.

FIG. 12 illustrates an improvement over the dispenser 500 illustrated in FIG. 11. As illustrated, the improved dispenser 502 includes a wand 512 which is not generally parallel to the body of the dispenser 502. Instead, the wand 512 angles at an immediate 30-degree angle relative to the body of the dispenser 502. In so doing, the wand 502 of the improved dispenser is in a more ergonomic position allowing a user to easily point the nozzle attached to the wand 512 at the ground or an application surface. The improved dispenser 502 also allows the user to aim the direction of the spray using the entire length of the wand 512 as a reference as opposed to estimating by looking at an angled tip of the wand 510 in the traditional dispenser 500.

Figure 13:
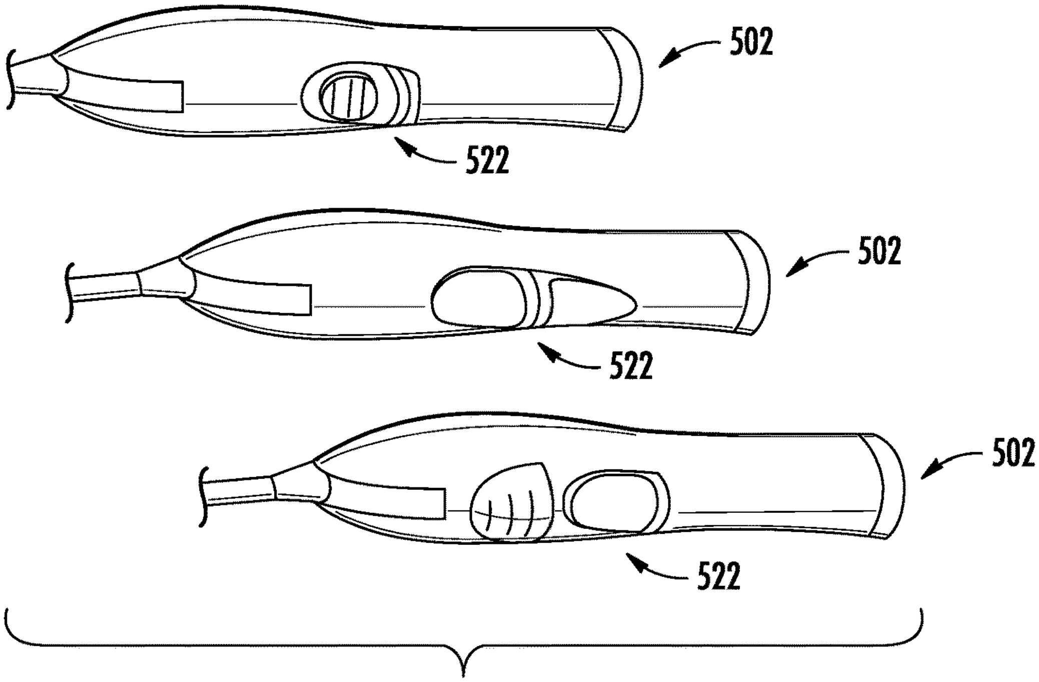
FIG. 13 illustrates various dispensers according to various embodiments of the invention.

Various dispensers 502 according to other embodiments of the invention may also include finger fatigue relief features in the form of actuation locks 522 as illustrated in FIG. 13. Each actuation lock 522 may be engaged to lock the dispenser 502 in a dispensing or actuated mode. For example, a slide switch may be used as an actuation lock 522 according to some embodiments of the invention. In other embodiments, a second button may be used as an actuation lock 522 to allow for a timed duration of spray. In still other embodiments, a physical lock may lock the actuator into place to continue the actuation of the dispenser 502.

Figure 14:
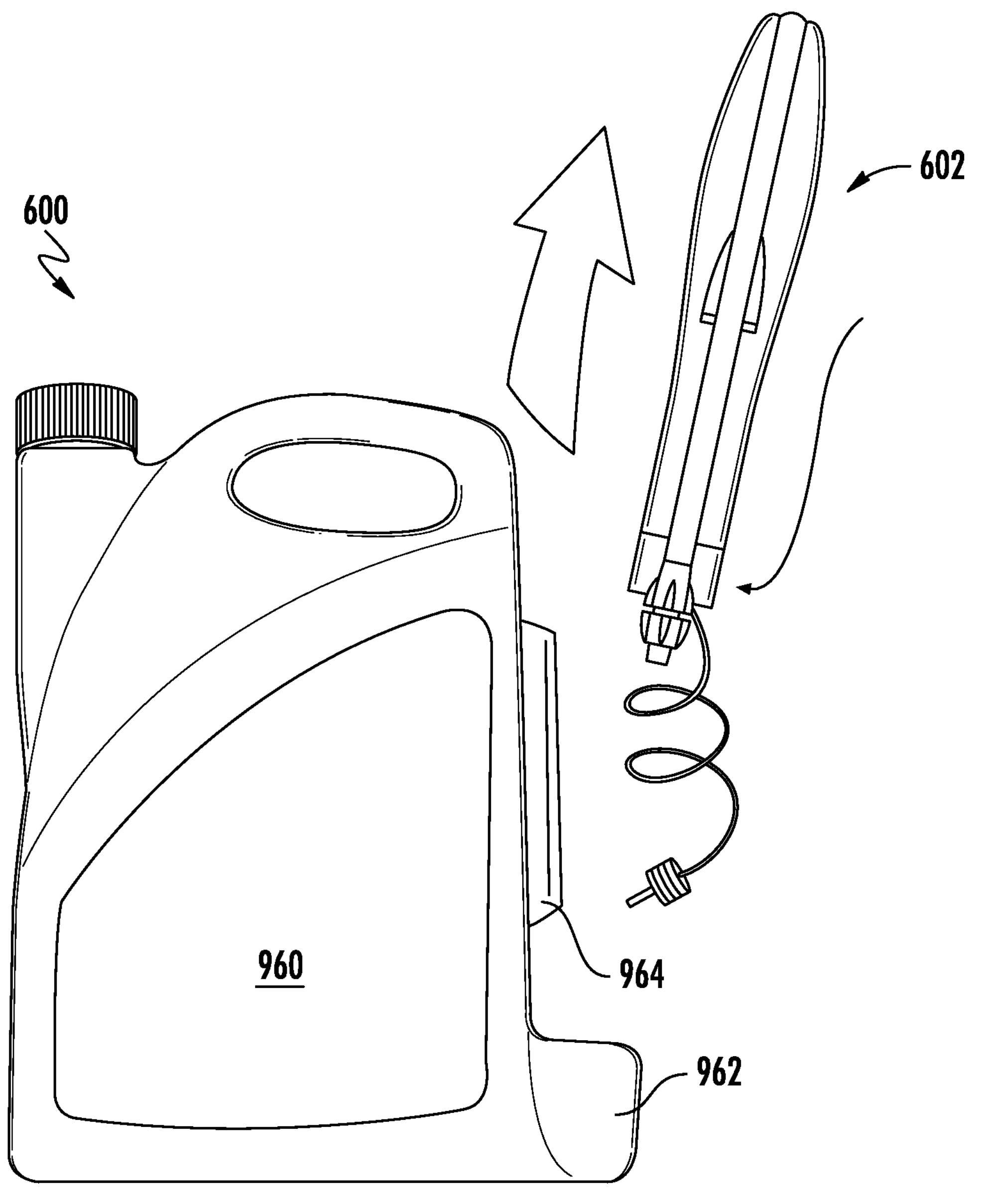
FIG. 14 illustrates a dispensing system with a dispenser according to various embodiments of the invention.
Figure 15:
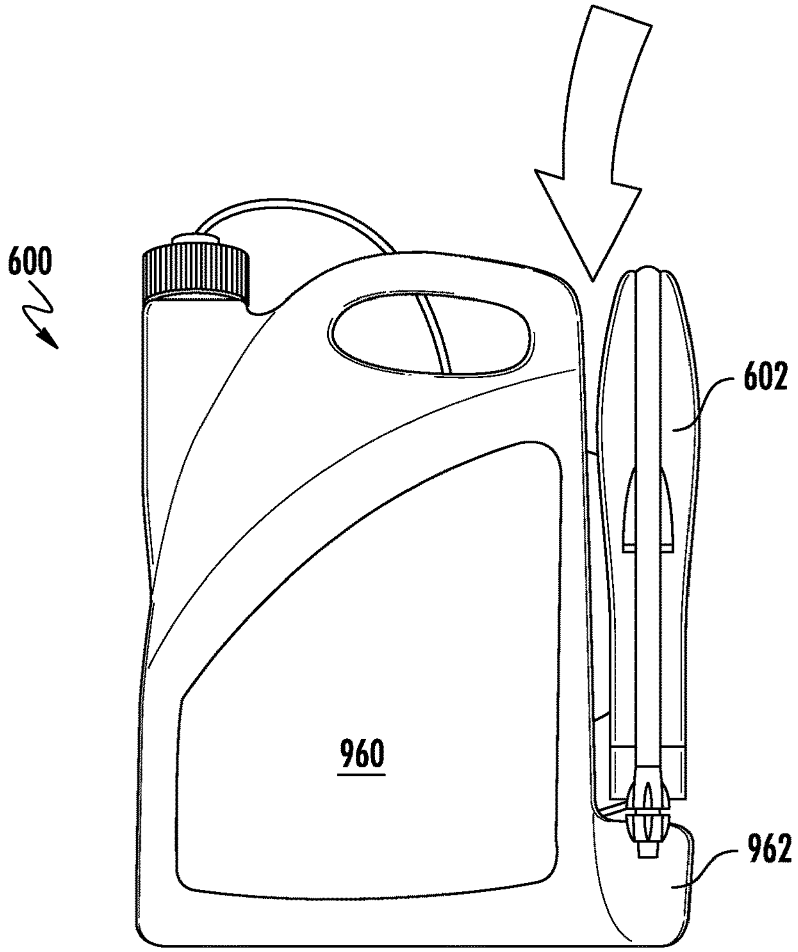
FIG. 15 illustrates a dispensing system with a dispenser according to various embodiments of the invention.

A dispensing system 600 according to still other embodiments of the invention is illustrated in FIGS. 14 and 15. In some embodiments, a dispensing system 600 may include a dispenser 602 and a container 960 wherein the container 960 is configured to support the dispenser 602 when not in use. In many conventional systems, a dispenser is supported by a separate holster that is attached to or hung from a container. According to various embodiments of the invention, container 960 may include a support feature 962 into which the dispenser 602 may snap or otherwise sit. A container 960 may also include one or more splines 964 which may slide into a portion of the dispenser 602 to retain the dispenser 602 adjacent to, or on, the container 960.

Figure 16:
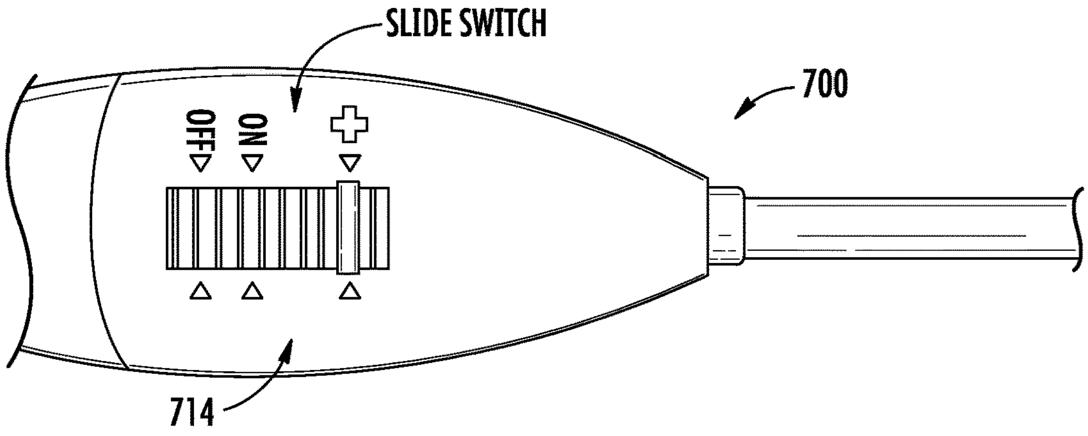
FIG. 16 illustrates an improved dispenser according to various embodiments of the invention.

According to various embodiments of the invention, a dispenser 700 may include a switch 714 to turn a battery-operated sprayer "on" or "off" In addition, the switch 714 may include a "boost" mode as illustrated in FIG. 16. In "boost" mode, additional power may be applied to the motor or dispensing mechanism of the dispenser 700 to improve the dispensing performance or provide additional power to create a stronger spray.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A method for dispensing a product from a dispensing system, comprising:

providing a dispensing system comprising:

a container;

a product stored in the container;

a dispensing unit attached to the container, wherein the dispensing unit comprises a battery-operated spray mechanism including a battery-operated motor, and at least one battery; and a wand connected to the dispensing unit, wherein the wand is moveable between a location against the container and a location extended away from the container;

moving the wand to a location extended away from the container; and activating the dispensing unit, wherein said activation moves product from the container through the wand.

2. The method of claim 1, wherein the dispensing unit further comprises:

a button, wherein depression of the button provides power from the at least one battery to the battery-operated motor.

3. The method of claim 1, wherein the wand comprises a nozzle.

4. The method of claim 1, wherein the wand comprises a first end and a second end, the first end rotatably connected to the dispensing unit and the second end moveable from a location against the container to a location extended away from the container.

5. The method of claim 4, wherein the second end of the wand comprises a nozzle.

6. A method for dispensing a product from a container, comprising:

providing a container;

providing a product in the container;

attaching a dispensing unit to the container, the dispensing unit comprising:

a button;

a battery-operated spray mechanism, including a battery-operated motor;

at least one battery; and a wand comprising an "on" position wherein the wand is located away from the container, and an "off" position wherein the wand is located against the container;

moving the wand to the "on" position; and actuating the button.

7. The method of claim 6, further comprising the step of spraying the product from the wand.

8. The method of claim 6, wherein the step of actuation of the button provides power from the at least one battery to the battery-operated motor.

9. The method of claim 6, wherein the step of actuation of the button powers the battery-operated spray motor and pumps product from the container through the wand.

10. A method for manufacturing a dispensing system, comprising:

providing a container;

providing a product;

filling the container with the product;

providing a dispensing unit comprising:

a button;

a battery-operated spray mechanism, including a battery-operated motor;

at least one battery; and a wand;

attaching the dispensing unit to the container; and wherein the wand is rotatable between a location against the container and a location extended away from the container.

11. The method of claim 10, wherein the wand comprises a nozzle.

* * * * *